United States Patent [19]

Castaldo et al.

[11] Patent Number: 6,112,971
[45] Date of Patent: Sep. 5, 2000

[54] MULTI-NOZZLE COMBUSTION END COVER VACUUM BRAZING PROCESS

[75] Inventors: Dean Henry Castaldo, Chatham; Bernard Arthur Couture, Latham; Anne Elizabeth Kolman, Niskayuna; David Robert Schumacher, Scotia, all of N.Y.

[73] Assignee: General Electric Co., Schenectady, N.Y.

[21] Appl. No.: 09/310,246

[22] Filed: May 12, 1999

[51] Int. Cl.[7] ............... B21D 39/04; B23K 1/00; B23K 1/19; B23K 20/16; B23K 20/22

[52] U.S. Cl. ............... 228/126; 228/262.1; 228/262.42; 228/262.9

[58] Field of Search ............... 228/126, 262.1, 228/262.42, 262.9

[56] References Cited

U.S. PATENT DOCUMENTS

| | | | |
|---|---|---|---|
| 3,673,678 | 1/1998 | Moreau et al. | 29/494 |
| 3,846,903 | 11/1974 | Rupert et al. | 29/487 |
| 3,900,649 | 8/1975 | Hart et al. | 428/76 |
| 3,918,623 | 11/1975 | Ishiguro et al. | 228/127 |
| 4,231,815 | 11/1980 | Snyder | 148/24 |
| 5,013,948 | 5/1991 | Tumpey et al. | 310/68 D |
| 5,399,257 | 3/1995 | Russ et al. | 208/48 R |
| 5,705,794 | 1/1998 | Moreau et al | 29/494 |

*Primary Examiner*—Patrick Ryan
*Assistant Examiner*—Zidia T. Pittman
*Attorney, Agent, or Firm*—Nixon & Vanderhye

[57] ABSTRACT

A brazing process is provided that addresses the braze joint failure problems encountered in some multi-nozzle combustion end covers. The brazing process embodying the invention provides optimal, predictable low cycle fatigue joint life in particular when brazing 304L stainless steel parts using Amdry 915 braze alloy. The invention was realized in particular in the combination of and application of tightly controlled vital variables of gap, braze alloy, braze peak temperature hold time, cooling (quench) rate, surface finish and braze media to optimal limits for the process parameters. The process provides robust/reliable design limits for braze joints experiencing stress during operation.

17 Claims, 4 Drawing Sheets

MULTI-NOZZLE COMBUSTION END COVER VACUUM BRAZING PROCESS

TECHNICAL FIELD

The present invention relates to brazing of the multiple end cover inserts into an end cover assembly and more particularly to improved engineering requirements and process specifications for vacuum furnace brazing of multi-nozzle combustion end cover assemblies.

BACKGROUND OF THE INVENTION

The use of braze joints on GE combustion end covers began in 1986. FIG. 1 is a cross-section of the first GE combustion end cover design with braze joints. This end cover 140, called MNQC, is constructed with five inserts 120 having 3 braze joints 100 each. Two of the braze joints are located at the same diameter, and the third is located at a different diameter. The braze joints are exposed to two different temperature ranges, 0 to 200° F. and 675 to 725° F., during operation of the gas turbine. This change in temperature in combination with an internal pressure of approximately 200 lb/in$^2$ results in stresses at the braze joints 100. However, to date, this type of end cover has not experienced a failure at the braze joints under these stresses.

As combustion systems evolved over time, the end cover increased in complexity and now undergoes larger temperature changes and pressure forces. FIG. 2 represents a DLN combustion end cover 14 introduced in 1993. This type of end cover has as many as six inserts 12 having 4 braze joints each. As can be seen in FIG. 2, and as schematically shown in FIG. 3 (discussed below), the joints 10 are located at three diameters instead of two, which creates increased challenges for maintaining the machining tolerances. In addition, during operation of the gas turbine, a braze joint will be subjected to as many as four different temperature changes instead of two changes. The braze joints 10 are also exposed to a larger range of temperatures: 0 to 450° F. and 675 to 800° F. Moreover, the pressure force on the end cover has increased to 250 lb/in$^2$. Thus, combustion end covers, in particular those made of 304L stainless steel and brazed with AMDRY 915, (Ni-13Cr-2.8B-4Si-4Fe) experience varying stress levels during field service depending upon their design. The increased complexity, and larger temperature changes and pressure forces of recent designs, have caused increased stresses at the braze joints.

By 1996, end cover failures began to occur with the end cover assemblies of the newer, more complex design. On break down, scorch marks were discovered on the failed end cover(s). Scorch marks on an end cover indicate a fuel leakage that could be the result of braze joint failure. To consider the impact of a braze joint on technical performance, one must consider the connection from the power plant to the gas turbine within it, to the combustion system of the gas turbine, to the end cover assembly. The end cover and inserts are connected with braze joints. If a braze joint fails, you get scorch marks. Braze joint failures could lead to catastrophic turbine failure, which could mean forced outages.

GE specification P9F-AG4, *Acceptance Requirements, Brazing Vacuum Combustion Parts*, originally issued Sep. 21, 1984 was used to specify the brazing process for combustion end covers. That specification did not, however, provide process specific requirements. GE specification P9F-AG7, *Vacuum Furnace Brazing of Multi-nozzle Endcovers*, was introduced May 24, 1996. P9F-AG7 introduced limited process parameters, in particular, a peak brazing temperature range of not less than 2075° F. nor greater than 2150° F., and a pre-braze diametrical gap size of 0.001–0.005 inches, common for either braze paste for braze foil processes.

BRIEF SUMMARY OF THE INVENTION

An end cover has, e.g., 6 inserts with 4 braze joints each. Thus, an end cover has up to 24 braze joints. If just one braze joint fails, the end cover is defective. It became evident from end cover failures that the braze joints needed to be more fully understood to optimize the design and avoid failures.

To address the problem of braze joint failures and to define process parameters yielding optimal braze joints, a design equation has been generated based on low cycle fatigue testing of braze samples produced under a specified range of process parameter limits. This equation predicts low cycle fatigue life of brazed joints as a function of temperature and strain range percent:

$$\text{Log Life} = 3.03 + 0.225 \text{ Strain Ratio} - 1.18 \text{ Strain} -$$
$$0.202 \text{ Temp} - 0.355 \text{ Gap} - 0.184 \text{ Braze Media} -$$
$$0.273 \text{ Quench} - 0.418 \text{ Temp2} - 0.418 \text{ Strain} * \text{Temp}$$

The low cycle fatigue curves generated from the design of experiments transfer function are reproduced as FIG. 4. The transfer function and related low cycle fatigue curve referenced above illustrate a reduction of the design of experiments testing to design practice. The design of experiments test data has been reduced to a manufacturing process to provide the specific brazing process parameter limits of the invention, which yield optimal braze joints.

The invention thus provides a brazing process that addresses the problem of braze joint failure in multi-nozzle combustion end covers by defining key brazing process parameters which yield optimal, predictable low cycle fatigue joint life, in particular when brazing 304L stainless steel parts using Amdry 915 (Ni-13Cr-2.8B-4Si-4Fe) braze alloy.

More specifically, in a presently preferred embodiment, the invention is realized in the combination of and application of tightly controlled vital variables such as gap, braze alloy, braze peak temperature hold time, cooling (quench) rate, surface finish and braze media to optimal limits for the process parameters. The process provides robust/reliable design limits for brazed joints experiencing stress during operation.

Accordingly, the invention is embodied in a process for brazing a nozzle insert into an end cover, wherein the diametrical gap between the insert receiving bore of the end cover and the insert is in the range of about 0.001–0.005 inches when braze paste is used or about 0.002–0.006 inches when braze foil is used; the end cover/insert assembly is heated to a peak brazing temperature of between about 2075 to 2175° F., and maintained at that brazing temperature for between about 20 to 60 minutes. The resulting brazed assembly is thereafter cooled at a controlled rate of less than or equal to 7.5 degrees per minute from the peak temperature to about 1750° F. and at a rate of about 10 to 20 degrees per minute from about 1500° F. to about 1000° F. In a presently preferred embodiment, at least the surfaces to be brazed are machine finished in the range of 32 to 63 finish. Furthermore, it is presently preferred that the end cover and inserts be formed from 304L stainless steel, and that the braze material is Amdry 915 (Ni-13Cr-2.8B-4Si-4Fe).

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
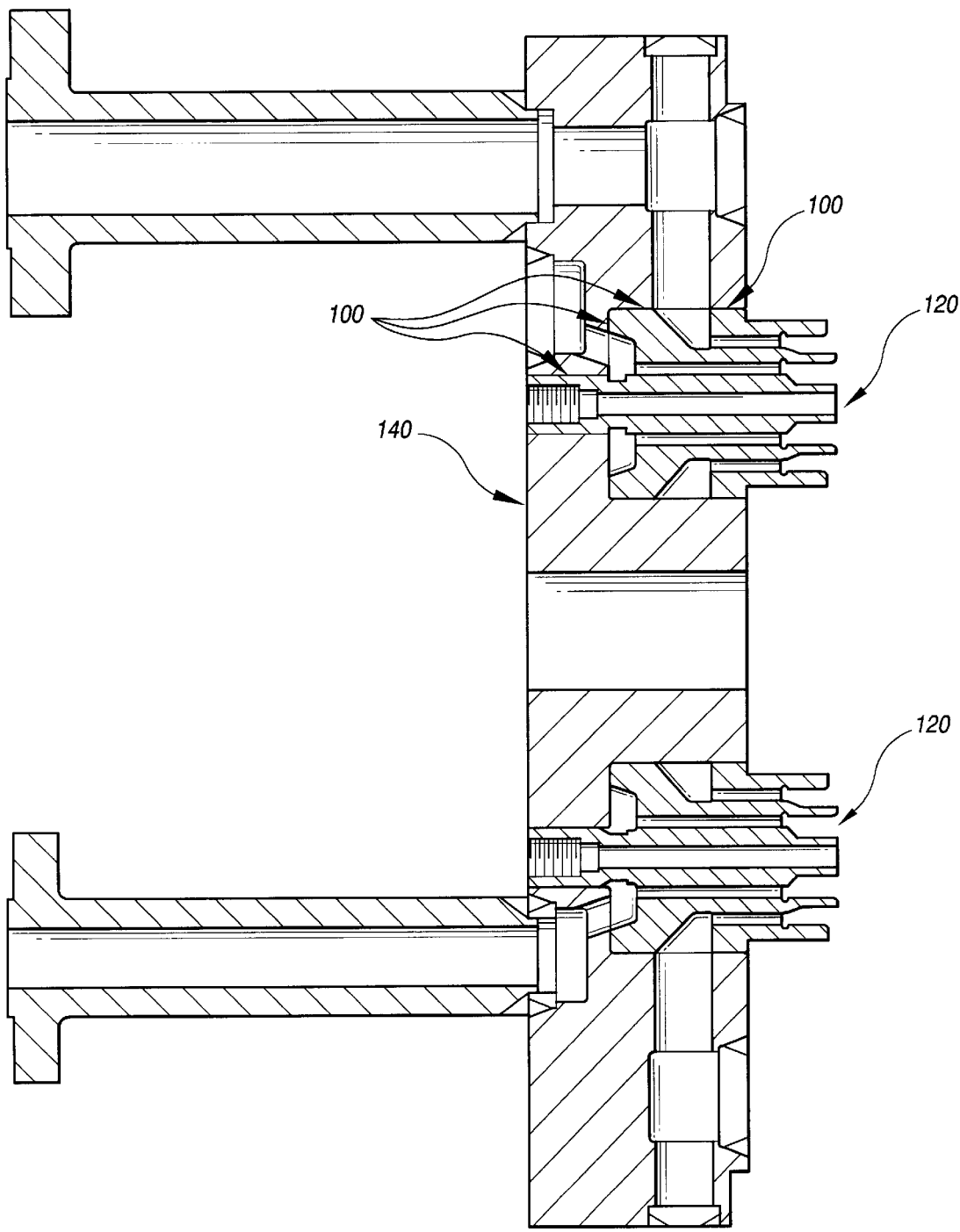
FIG. 1 is a schematic cross-section of the GE MNQC end cover assembly.
Figure 2:
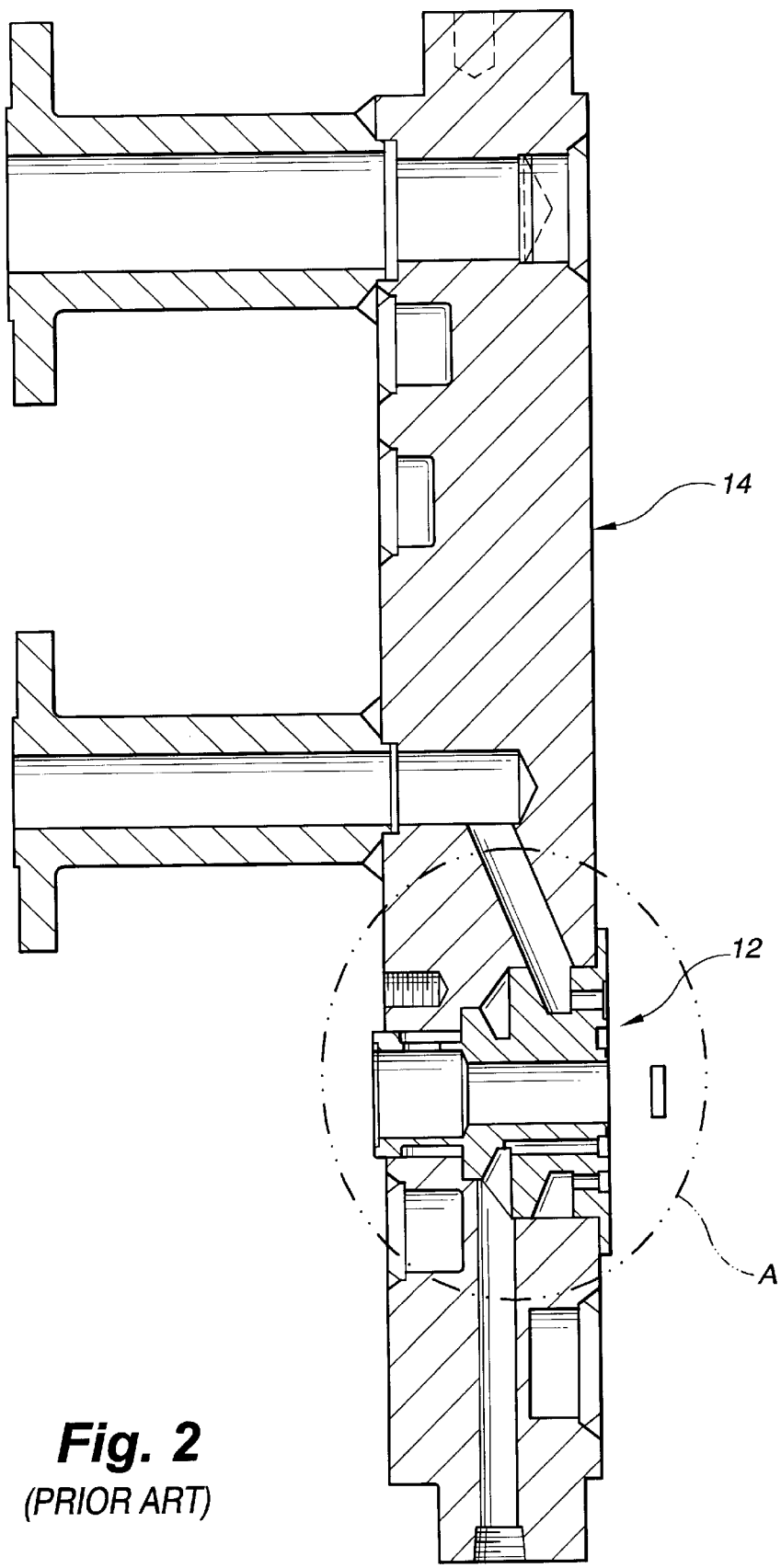
FIG. 2 is a schematic cross-section of the GE DLN combustion end cover assembly.
Figure 3:
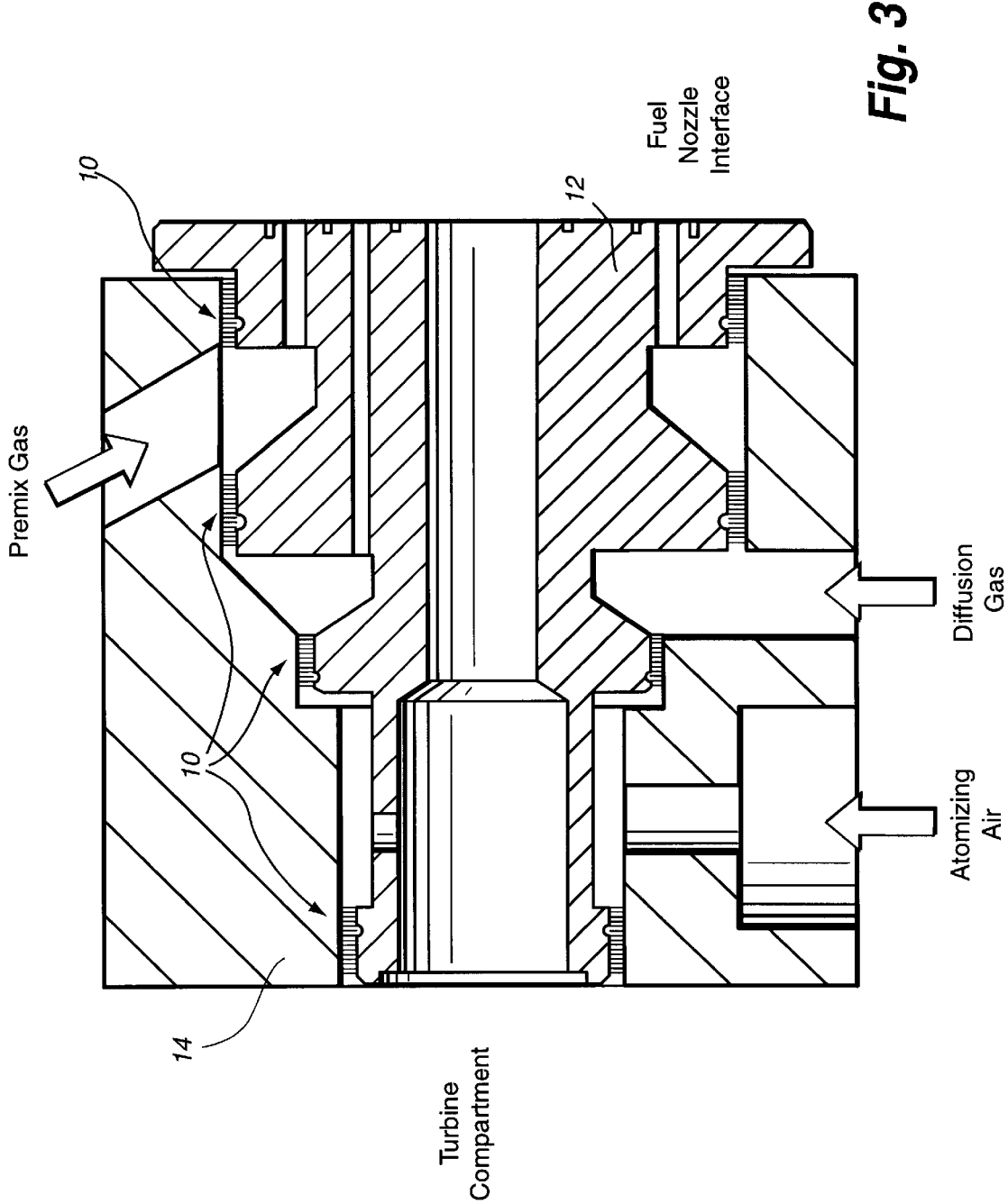
FIG. 3 is a schematic cross-section of an insert connected to an end cover with braze joints.

FIG. 3 is a schematic cross-sectional view of an end cover 14 and insert 12 assembly, corresponding to the insert type shown in FIG. 2. There are passages for gas and air as illustrated. The braze joints 10 connect the insert 12 to the end cover 14 and define the structural connection between and among the passages, the insert and the outside of the end cover for air and gas flow.

As described above, as the combustion system evolved over time, the complexity, temperature changes, and pressure forces increased. These changes over time led to combustion end cover field issues which led us to begin investigating the possible causes. We started with a Cause and Effect Diagram to identify a variety of braze process variables which were sorted into categories, namely, measurements, environment, materials, methods, manpower, and machines. Within these categories, we identified several variables as being of higher complexity than the others, i.e., requiring design of experiments to evaluate. Those variables included operating temperature, joint strain, braze media, braze alloy, braze quench rate, surface finish, graze gap, and braze hold time.

After identifying the braze process variables we proceeded to perform a design of experiments. Since the failure mode of an end cover braze joint is low cycle fatigue we needed to produce braze test specimens on which to perform low cycle fatigue testing. The braze joints in the test specimens had to be produced in a way which would be identical to the braze joints produced in an actual end cover.

Thus, stainless steel slabs were machined to produce the surface finish and strain ratio. The slabs were assembled with braze media forming the braze gap according to the DOE. The slabs were then placed in a modified end cover and covered with a heat shield. This guaranteed that the braze joints in the slabs would be subjected to the same thermal loading as the braze joints in an actual end cover. The end cover and slab assembly was placed in a vacuum brazing furnace where quench rate and hold time were varied according to the DOE. After the brazing furnace cycle was complete the samples were removed and the LCF test specimens were cut. The specimens were run in a fatigue test rig where strain level and temperature level were varied according to the DOE. The output was cycles to failure as a function of the variables for each test specimen.

We performed a screening and a validation DOE. See Table 1 below. The screening DOE was unique due to the need for (9) nine different factors along with up to (4) levels for each factor. The added level of DOE complexity made it possible to resolve any non-linear behavior of the factors and/or reactions among factors. A validation DOE was then run with fewer factors and levels, i.e., higher resolution to verify the results of the screening DOE.

TABLE 1

Design of Experiments

| 13-8 Screening DOE $2_{IV}$ (32 Run) | | 3 Validation DOE 2 (16 Run) | |
|---|---|---|---|
| Strain | 4 levels | Strain | 2 levels |
| Temperature | 4 levels | Braze Media | 2 levels |
| Gap Size | 4 levels | Quench Rate | 2 levels |
| Vendor | 3 levels | Set to Optimum setting | |
| Strain Ratio | 2 levels | Temperature | Constant |
| Surface Finish | 2 levels | Strain Ratio | Constant |
| Braze Media | 2 levels | Gap Size | Constant |
| Braze Hold Time | 2 levels | Vendor | Constant |
| Quench Rate | 2 levels | Surface Finish | Constant |
| | | Braze Hold Time | Constant |
| DOE Optimized Process Vital X's for Maximum Braze Joint Life | | | |

Using the input variables (X's) and the output responses (Y's) of the LCF testing we performed a regression analysis to derive the design equation (Transfer Function) for the braze joints. The equation as shown below predicts low cycle fatigue life of brazed joints as a function of the input variables (X's).

$$\text{Log Life} = 3.03 + 0.225 \text{ Strain Ratio} - 1.18 \text{ Strain} - 0.202 \text{ Temp} - 0.355 \text{ Gap} + 0.184 \text{ Braze Media} - 0.273 \text{ Quench} - 0.418 \text{ Temp}2 - 0.418 \text{ Strain} * \text{Temp}$$

The High/Low cut off points for the process variables (X's), detailed herein below, were set using expert braze process knowledge which we needed to refine and find possible interactions using the DOE. The strain level was set using knowledge of the maximum upper strain limit in the testing of the parent material (304L Stainless steel). The LCF testing temperature was set using field experience of Gas Turbine end cover operating conditions. The braze gap size was set using braze alloy Material Engineering and Manufacturing knowledge, as further explained below. Three different Vendor brazing furnaces were used in the DOE so that furnace variation could be captured. The strain ratio or slab angle was set to 90 deg. for a pure tensile condition and set to 45 deg. for an equal shear/tensile condition where shear could be derived. The surface finish was set using feasible manufacturing limits for surface finish on these configurations, the upper limit (200 rms) was established as the worst surface condition possible which would still allow for a reasonable dimensional measurement of the component. The two types of braze media used (Paste/Foil) are the media forms commercially available and most applicable to these component configurations. The braze hold time and quench rate were set using Materials Engineering knowledge for these types of components.

Figure 4:
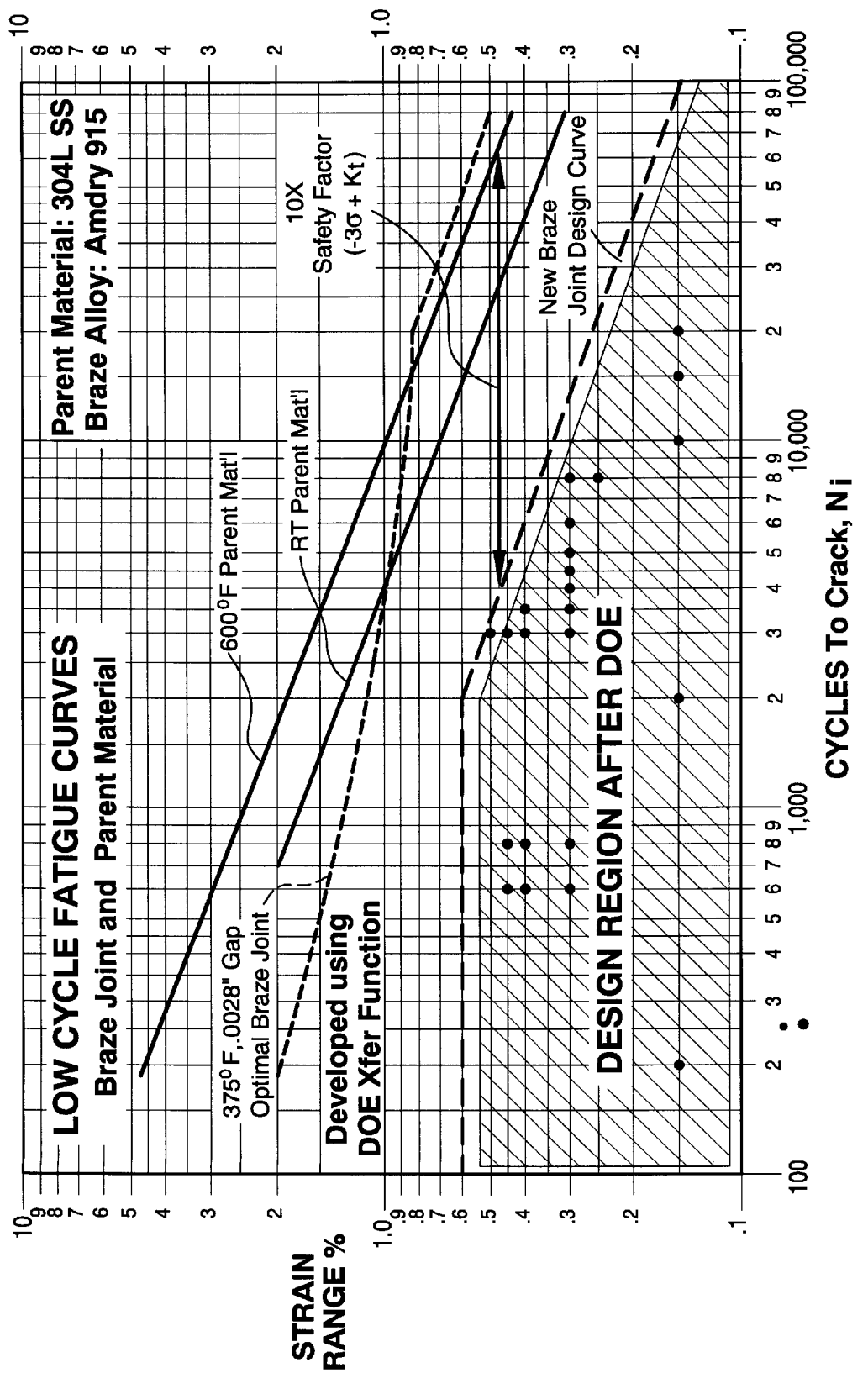
FIG. 4 shows the Low Cycle Fatigue curves generated from the Design of Experiments transfer function ( Strain vs. Cycles To Crack Initiation (LIFE)) in accordance with the invention.

The Low Cycle Fatigue design curve was generated using the DOE transfer function, an upper total strain range limit of 0.6% along with a 10 times notch sensitivity factor—the last two provide an additional factor of safety for design purposes. The final LCF Design curve is illustrated in FIG. 4. Thus, the DOE also provided a useful tool for predicting the life of end cover braze joints. Before the DOE, design engineers used low cycle fatigue curves for unbrazed stainless steel for predicting the life of end cover braze joints (the curve in FIG. 4 labeled 600° F. Parent Mat'l). After the DOE and development of a transfer function, the acceptable life for end cover braze joints changed to the shaded region in the lower left of FIG. 4. Thus, there now is a more accurate means for predicting the life of end cover braze joints.

As noted above, the braze gap size was set using braze alloy material engineering and manufacturing knowledge. We had realized that braze gap was a vital variable for braze joint life because when gaps fail, braze joints leak and there is combustion end cover failure. During our evaluation, we found, for example, that a 0.026 inch gap produced a good braze joint, whereas a 0.055 inch gap, when using braze paste, did not. We found that the braze joints with a large gap have a eutectic formation caused by the large gap. A eutectic formation leads to cracking and joint failure. The braze gap is the difference between the end cover bore diameter and the insert outer diameter. This gap must be controlled, in accordance with the invention, and limited to a prescribed range to optimize joint life. To control gap, the variability of both the end covers and inserts must be controlled. Variability can be reduced with operator training and machine and tool upgrades, and with treatments, such as heat treatment to reduce bore distortion.

As a result of our investigation, we have determined optimal limits for the brazing process parameters. By using the combination of and by tightly controlling the vital process variables as detailed herein, the brazing process provides optimal, predicable low cycle fatigue joint life, specifically when brazing 304L stainless steel parts using Amdry 915 (Ni-13Cr-2.8B-4Si-4Fe) braze alloy. The key process parameters identified as a result of the investigation outlined above, which produce optimal braze joints, are detailed herein below with reference to an exemplary brazing process.

It is conventional in the industry for a supplier to submit a detailed Manufacturing Process Plan (MPP) outlining all of the operations, and the sequences in which they are performed, to prepare, braze, inspect, and repair multi-nozzle end cover assemblies. Any such MPP must conform to specified process production requirements identified by the purchaser. The present invention provides process production requirements, in particular, brazing process parameter limits, for yielding an optimum braze joint.

Before end cover inserts are brazed into the cover assembly, all assemblies, fixtures and braze joint regions must be suitably degreased to remove all surface dirt, oil, or other foreign matter that could adversely affect the quality or service performance of the brazed assemblies or furnace components. It is recommended that cleaning be effected with a clean stainless steel brush followed by wiping with a suitable solvent. The faying surfaces to be brazed may be vacuum heat-treated before brazing for the purposes of final cleaning to remove surface oxides.

To provide an optimum braze joint, in accordance with the invention, it is presently preferred that the machine finish of the end cover bore and insert diameter faying surfaces be in the range of 32 to 63 finish, inclusive.

Following cleaning, all end cover assembly parts are suitably sealed, for example in plastic bags, to protect them and avoid re-contamination of surfaces prior to brazing. Moreover, for all operations following cleansing, until the parts are brazed, the parts should be handled only with, for example, clean white cotton gloves, to avoid contamination.

As explained above, we recognized that braze gap is a vital variable. Accordingly, for an optimum brazed joint, the braze joint gap must be controlled to be within defined limits. Those limits depend upon the form of the brazing filler material, as detailed below. To confirm that a suitable braze gap is defined by the parts, all braze gaps should be calculated immediately prior to brazing by measuring end cover bore diameters and insert diameters of all braze joints so that the diametrical braze gaps for each braze joint can be calculated.

If braze paste is used, for an optimum braze joint embodying the invention, the braze joint gaps must range between 0.001–0.005 inches diametrical for each insert. If braze foil is used, all braze joint gaps must be between 0.002–0.006 inches diametrical. In all cases the process is centered at the midpoint of the allowed range.

The brazing filler material is preferably Sulzer Plasma Technik, Inc. AMDRY 915 (Ni-13Cr-2.8B-4Si-4Fe). Braze filler is placed prior to brazing as specified in the MPP, at the locus of the braze joints 10, shown in FIG. 2. Stop-off is applied as required to restrict the flow of braze filler away from the joint areas.

Brazing is performed in accordance with a pre-approved MPP using a vacuum furnace brazing process with a pressure no higher than $1 \times 10^{-3}$ Torr (1 micron).

Fixtures may be used when required to support and restrain assemblies during brazing in order to control assembly dimensions within required limits. Moreover, the end cover assemblies are positioned in the furnace such that the braze flow direction conforms with the MPP, such that uniform heating is achieved throughout all assemblies, and such that the braze joint quality requirements set forth by the purchaser are satisfied.

The assembly is heated to the brazing temperature at controlled rates and with thermal holds as specified in the MPP. However, to provide an optimum braze joint embodying the invention, a range of peak brazing temperatures has been determined, as well as the time at peak temperature. Thus, it has been determined that for optimum braze joints the peak brazing temperature shall be not less than 2075° F. nor greater than 2175° F. Moreover, the time at peak temperature is between 20 and 60 minutes. Suitably placed thermocouples are used to determine process temperatures.

It has also been determined that for optimum braze joints the cooling rate must be controlled. More particularly, it has been determined that the end covers are to be cooled from the peak temperature to 1750° F. at a rate no greater than 7.5 degrees per minute whereas the cooling rate from 1500° F. to 1000° F. is to be 10–20 degrees per minute.

It is permissible to repair or correct defective braze joints that do not meet inspection criteria by re-application of braze filler material, if required, and a single re-braze cycle.

A post braze surface treatment is permissible, if deemed necessary or desirable. Thus, the cosmetic surface appearance of brazed assemblies may be enhanced by the use of pressure blasting with 100 mesh glass beads, provided that conditions that would result in damage to or removal of braze filler material or creation or concealment of defects is avoided. Blasting pressure is not to exceed 80 psi and stand-off distances are not to be less than six inches.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed:

1. A process for brazing a nozzle insert structure into an end cover, comprising:

providing an end cover having first and second surfaces and having at least one bore for receiving an insert structure extending between said surfaces, said bore having a stepped inner bore so as to have at least first and second inner diameters;

providing an insert structure for being received in a respective said bore, said insert structure having first and second ends and a nozzle bore defined therethrough, and outer surface of said insert structure being stepped so as to have at least first and second outer diameters, generally corresponding to said inner diameters of said bore of said end cover;

a difference between said first inner diameter of said inner bore and said first outer diameter of said insert structure being in a range of about 0.001–0.005 inches;

a difference between said second inner diameter of said inner bore and said second outer diameter of said insert structure being a range of about 0.001–0.005 inches;

applying a brazing material to pre-determined circumferential portions of said outer surface of said insert structure;

inserting said insert structure with said brazing material applied thereto into said respective end cover bore;

heating the assembly of said insert structure and end cover to a brazing temperature of between about 2075–2175° F.;

maintaining said brazing temperature for between about 20 to 60 minutes;

cooling the resulting brazed assembly of said insert structure and end cover from said brazing temperature to about an 1750° F. at a rate less than or equal to 7.5 degrees per minute; and cooling the assembly from about 1500° F. to about 1000° F. at a rate of about 10 to 20 degrees per minute.

2. A process as in claim 1, wherein at least the surfaces to be brazed are vacuum heat-treated before brazing for final cleaning to remove surface oxides.

3. A process as in claim 1, wherein at least in the surfaces to be brazed are machine finished in the range of 32 to 63 finish.

4. A process as in claim 1, wherein the pressure in said furnace at least during said heating step is less than or equal to $1 \times 10^{-3}$ Torr.

5. A process as in claim 1, wherein said braze material is a braze paste.

6. A process as in claim 5, wherein said braze paste is Ni-13Cr-2.8B-4Si-4Fe.

7. A process as in claim 1, wherein said end cover and said insert structure are each formed from 304L stainless steel.

8. A process as in claim 1, further comprising, after said cooling step, surface treating said assembly by pressure blasting with glass beads.

9. A process as in claim 8, wherein said pressure blasting is with 100 mesh glass beads, at a blasting pressure of less than 80 psi and with a stand-off distance of at least six inches.

10. A process as in claim 1, further comprising inspecting the brazed joints of said assembly, determining defective braze joints, and repairing defective braze joints by re-applying braze material and re-brazing said assembly.

11. A process for brazing a nozzle insert structure into an end cover comprising:

providing an end cover having first and second surfaces and having at least one bore for receiving an insert structure extending between said surfaces, said bore having a stepped inner bore so as to have at least first and second inner diameters;

providing an insert structure for being received in a respective said bore, said insert structure having first and second ends and a nozzle bore defined therethrough, and outer surface of said insert structure being stepped so as to have at least first and second outer diameters, generally corresponding to said inner diameters of said bore of said end cover;

a difference between said first inner diameter of said inner bore and said first outer diameter of said insert structure being in a range of about 0.002–0.006 inches;

a difference between said second inner diameter of said inner bore and said second outer diameter of said insert structure being a range of about 0.002–0.006 inches;

applying a brazing foil to pre-determined circumferential portions of said outer surface of said insert structure;

inserting said insert structure with said brazing material applied thereto into said respective end cover bore;

heating the assembly of said insert structure and end cover to a brazing temperature of between about 2075–2175° F.;

maintaining said brazing temperature for between about 20 to 60 minutes;

cooling the resulting brazed assembly of said insert structure and end cover from said brazing temperature to about 1750° F. at a rate less than or equal to 7.5 degrees per minute; and cooling the assembly from about 1500° F. to about 1000° F. at a rate of about 10 to 20 degrees per minute.

12. A process as in claim 11, wherein at least the surfaces to be brazed are vacuum heat-treated before brazing for final cleaning to remove surface oxides.

13. A process as in claim 11, wherein at least in the surfaces to be brazed are machine finished in the range of 32 to 63 finish.

14. A process as in claim 11, wherein the pressure in said furnace at least during said heating step is less than or equal to $1 \times 10^{-3}$ Torr.

15. A process as in claim 11, wherein said end cover and said insert structure are formed from 304L stainless steel.

16. A process as in claim 11, further comprising, after said cooling step, surface treating said assembly by pressure blasting with glass beads.

17. A process as in claim 16, wherein said pressure blasting is with 100 mesh glass beads, at a blasting pressure of less than 80 psi and with a stand-off distance of at least six inches.

* * * * *